Patented July 28, 1942

2,291,452

UNITED STATES PATENT OFFICE 2,291,452

COLORED ORGANIC PIGMENT

Miles Augustinus Dahlen and Stanley Rawlings Detrick, Wilmington, Del., assignors to E. I. du Pont de Nemours & Company, Wilmington, Del., a corporation of Delaware No Drawing. Application March 10, 1939, Serial No. 260,912

5 Claims. (Cl. 106—308)

This invention relates to colored pigments of the phthalocyanine series. It is an object of this invention to improve the physical texture of phthalocyanine pigments, whereby to convert them into soft powders, readily dispersible in rubber and similar plastics. Other and further important objects of this invention will appear as the description proceeds.

By the term pigments of the phthalocyanine series we are referring to water-insoluble compounds of the group consisting of the metal-phthalocyanines, metal-free phthalocyanines, nuclear substitution derivatives of these such as the methyl, phenyl, nitro or halogen derivatives (but excepting water-soluble derivatives such as sulfo or carboxy), as well as the corresponding compounds of the naphthalocyanine series.

Pigments of the phthalocyanine series are generally produced in the art by a process involving in the end an "acid pasting" step. Acid pasting, as the term is generally employed in the art, refers to the step of dissolving the pigment in concentrated sulfuric acid and then reprecipitating by dilution with water. The pigment which is filtered off from the dilution mass generally has to be dried before it can be used for incorporation with liquid organic vehicles or plastics such as rubber. In the drying step, however, a physical transformation of the pigment takes place. The pigment particles cake together into hard lumps or agglomerates, which even after grinding to a fine powder give a pigment consisting of relatively hard particles, not readily dispersible in the oil or rubber media. The powder therefore is weak in tinctorial power, and requires prolonged grinding with the organic vehicle before the greater fraction of its tinctorial value can be developed in the vehicle. In the case of rubber the problem of "hard grinding" is particularly difficult, because the shearing and rubbing action on the individual particles in a rubber calender is very much weaker than that which it receives for instance when ground together with oil in an ink mill.

It has been known that in the case of other pigments higher fatty acids, for instance stearic acid, will often improve the dispersibility of the pigment in rubber. Such assistants are generally incorporated into the pigment by direct admixture. We have found, however, that in the case of phthalocyanine colors such assistants are of little effect if incorporated by direct, mechanical admixture.

We have now found that higher fatty acids and the corresponding higher alcohols are capable of improving the physical qualities of phthalocyanine pigments to an excellent degree if incorporated into the color by the special method of co-precipitation, that is, joint acid pasting. In other words, the phthalocyanine pigment and an aliphatic assistant from the group consisting of the higher fatty acids and the higher saturated alcohols are dissolved jointly in a common solvent, for instance concentrated sulfuric acid, and then precipitated jointly by pouring the solution into a large volume of water. The resulting precipitate may be filtered off, washed acid-free and dried. However, a still further improvement is obtained if the washed precipitate, before drying, is slurried with a little water and then agitated in contact with air or other inert gas (e. g. carbon dioxide or nitrogen) until a volume of air or inert gas has been occluded into the mass equal to from 15 to 30% of its initial volume. The aerated mass is then milled, for instance in a colloid mill, until the occluded air has been broken up into tiny bubbles having on the average a diameter between 10 and 30 microns. The milled mass is then evaporated to dryness in any convenient manner, for instance on a drum drier, in shallow trays or in a spray drier, at atmospheric pressure or in a vacuum.

The resulting pigment powder is characterized by a soft feel and crumbles readily when rubbed between the fingers. It disperses readily in rubber when worked on the rubber mill and is substantially equal in tinctorial strength and rate of dispersion to a color composition obtained by dispersing the same phthalocyanine coloring matter in latex. (U. S. P. 1,846,820 and 2,167,514.)

We believe that the improved effect is due to the tendency of the fatty assistant to coat the individual particles of the pigment at the instant of their precipitation, thus preventing them from becoming agglomerated with each other. We do not however wish to limit our invention to any particular theory, which is advanced merely for the purpose of explaining our present understanding of this invention.

As assistant for the above purpose, any fatty acid or fatty alcohol which is soluble in concentrated sulfuric acid but non-reactive therewith may be employed, provided it is of sufficiently high molecular weight to be insoluble in the dilute sulfuric acid resulting from the drowning step (usually, not more than 10% concentration). A minimum chain-length of 8 carbon atoms seems to satisfy the latter condition for practical purposes. In the cases where a higher fatty alcohol is employed as assistant, it is advisable to keep the concentrated sulfuric acid cool during solution, to avoid sulfation of the alcohol.

Without limiting our invention to any particular procedure, the following examples are given to illustrate our preferred mode of operation. Parts mentioned are by weight.

Example 1

22.5 parts of copper phthalocyanine and 2.5 parts of lauric acid were added to 250 parts of 98% sulfuric acid containing 2.5 parts of pyridine at 0° to 5° C. The charge was agitated until both pigment and lauric acid were in solution as shown by microscopic examination. The sulfuric acid solution then was added, slowly, to 2500 parts of water at 95° to 100° C. The resulting suspension was filtered, and the nutsch cake was washed acid-free to litmus papers. The cake may be re-slurried with water and again filtered in order to remove the last traces of sulfuric acid. A 10 to 12% suspension was then formed by adding the cake to water, with good agitation until its volume increased by about 20 to 30%. The foamy suspension was milled through a colloid mill and dried in an oven at 80 to 90° C. The dry product was a soft powder containing approximately 90% copper phthalocyanine. It was given a very light grinding and tested by milling into massive rubber. The powder dispersed rapidly in rubber with normal grinding on the calender, and exhibited a very high tinctorial strength. The product was also tested by moistening the powder with a small amount of dilute ammonia and adding the moistened pigment to latex or massive rubber. In each of these cases its rate of color development and its tinctorial strength were found to be very high as compared to the untreated pigment.

Example 2

The same procedure was followed as described in Example 1, stearic acid being substituted for lauric acid. The dry powder obtained was very soft and milled into massive rubber rapidly at normal grinding pressure. Excellent strength and dispersion were obtained in a relatively short time of milling.

Example 3

Following the procedure of Example 1, lauryl alcohol was substituted for lauric acid. A soft powder was obtained containing approximately 95% copper phthalocyanine. This product dispersed rapidly when milled into massive rubber to give a very high tinctorial strength, comparable to that obtained by dispersing an aqueous paste of copper phthalocyanine in rubber latex.

Example 4

22.5 parts of copper phthalocyanine and 2.5 parts of lauric acid were added to 375 parts of anhydrous phosphoric acid at 60 to 70° C. The charge was agitated until the pigment and lauric acid were in solution as shown by microscopic examination. The phosphoric acid solution then was added to 2500 parts of water at 95° to 100° C. The resulting suspension was then treated as in Example 1 up to and including the drying step. The dry product was a soft powder containing approximately 90% copper phthalocyanine. It was screened through a 200-mesh sieve, and tested by milling into massive rubber. The powder dispersed rapidly in rubber with normal grinding pressure, giving a strength approximately equal to that obtained by dispersing an aqueous paste of copper phthalocyanine in rubber latex.

Example 5

20 parts of chlorinated copper phthalocyanine (obtained as in Example 2 of U. S. Patent No. 2,195,984), and 5 parts of lauric acid were added to 250 parts of sulfuric acid monohydrate at 0° to 5° C. The charge was agitated until the pigment and lauric acid were in solution as shown by microscopic examination. The acid solution then was added to 2500 parts of water at 95 to 100° C. The resulting suspension was then treated as in Example 1, the dry powder being screened through a 200-mesh sieve, and tested by milling into massive rubber. The product was a soft powder and dispersed readily in the rubber, showing a 50% increase in tinctorial strength over a sample not similarly treated with lauric acid.

In a similar manner other water-insoluble phthalocyanine coloring matters may be converted into soft powders of improved texture and dispersibility. Likewise, any saturated aliphatic alcohol or aliphatic acid having at least 8 carbon atoms in a straight chain may be employed as the assistant. The ratio of pigment to treating agent may be varied to any extent according to the properties desired in the finished product. 1% of the assistant will produce a noticeable improvement, while 20 or 30% by weight of the entire composition may be considered as the upper limit of practical interest. The ratio of solvent to pigment may be varied over wide limits, the lower limit being controlled by the solubility of the pigment and treating agent in the solvent. The ratio of drowning water to acid is variable over wide limits. The pigment paste obtained from the acid-pasting operation may be dried as press cake. However, the best results are obtained by following the procedure as described in the examples including the aeration step.

It will be understood that many other variations and modifications may be practiced with our invention without departing from the spirit thereof.

We claim:

1. The process of producing a phthalocyanine pigment having improved dispersibility in rubber, which comprises forming a solution of the same in an acid selected from the group consisting of concentrated sulfuric acid and concentrated phosphoric acid, said acid containing further an aliphatic reagent selected from the group consisting of the saturated fatty acids and alcohols having an alkyl chain of more than 8 carbon atoms in their structure, diluting the solution with water to effect joint precipitation of the pigment and reagent, and separating the precipitated product from the acid.

2. The process of improving the physical texture of copper phthalocyanine, which comprises forming a solution of the same in concentrated sulfuric acid jointly with from 1 to 20% of its own weight of lauric acid, diluting the solution with water to precipitate jointly the pigment and the lauric acid, recovering the precipitate free of acid, agitating an aqueous slurry of the same in contact with air to increase its volume and then milling and drying the aerated mass.

3. The process of improving the physical texture of chlorinated copper phthalocyanine, which comprises forming a solution of the same in concentrated sulfuric acid jointly with from 1 to 20% of its own weight of lauric acid, diluting the solution with water to precipitate jointly the pigment and the lauric acid, recovering the precipitate free of acid, agitating an aqueous slurry of the same in contact with air to increase its volume and then milling and drying the aerated mass.

4. The process of producing a phthalocyanine pigment having improved dispersibility in rubber, which comprises forming a solution of the same in concentrated sulfuric acid containing further an aliphatic reagent selected from the group consisting of the saturated fatty acids and alcohols having an alkyl chain of more than 8 carbon atoms in their structure, adding said solution to a large volume of water at an initial temperature of not less than 95° C. to effect joint precipitation of the pigment and reagent, and separating the precipitated product from the acid.

5. The process of producing a phthalocyanine pigment having improved dispersibility in rubber, which comprises forming a solution of the same in concentrated sulfuric acid containing further a fatty acid having at least 12 carbon atoms in its structure, entering said solution into water at an initial temperature of 95 to 100° C. to effect precipitation of the pigment while simultaneously coating the particles thereof with said fatty acid, and recovering the precipitate free of sulfuric acid.

MILES AUGUSTINUS DAHLEN.
STANLEY RAWLINGS DETRICK.